INVENTOR
Carroll J. Wenzke

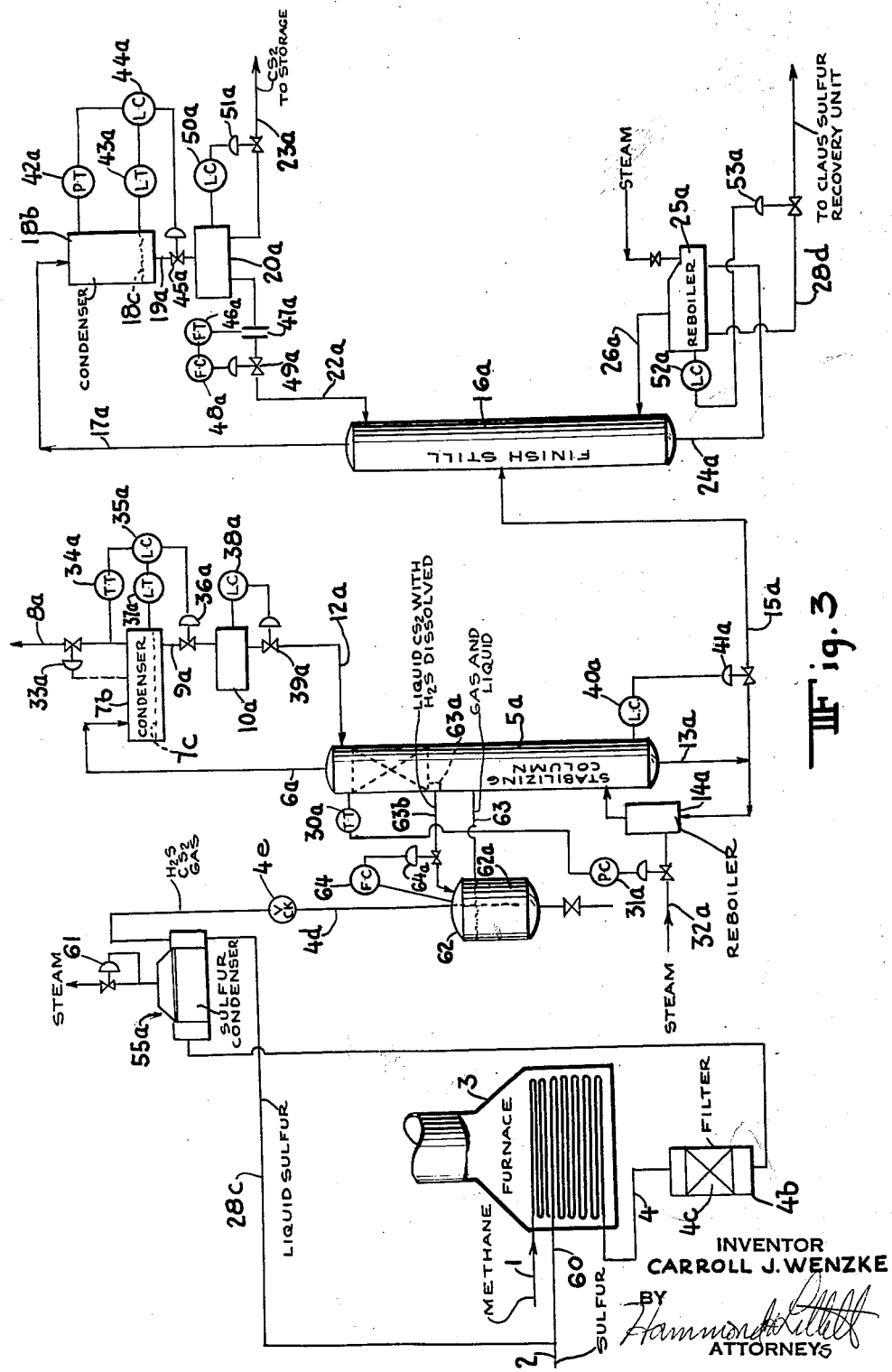

United States Patent Office 3,079,233
Patented Feb. 26, 1963

3,079,233
PROCESS FOR PRODUCING HYDROGEN SULFIDE AND CARBON BISULFIDE
Carroll J. Wenzke, Peekskill, N.Y., assignor to FMC Corporation, a corporation of Delaware
Filed July 1, 1960, Ser. No. 40,479
7 Claims. (Cl. 23—181)

This invention relates to the production of carbon bisulfide and hydrogen sulfide by the reaction of sulfur with hydrocarbons in a non-catalytic reaction at elevated pressure and temperature and is an improvement on the non-catalytic process described in application Serial No. 448,741, filed August 9, 1954, now Patent No. 2,882,130.

As described in said patent, carbon bisulfide can be produced in attractive commercial yields by the reaction of sulfur vapor and hydrocarbons at pressures above 3 atmospheres and at temperatures between 450° C. and 700° C. and retention time of between 6 seconds and 1.2 minutes without the use of a catalyst.

In the commercial processes of producing carbon bisulfide, by the reaction of sulfur and hydrocarbons heretofore used, whether by catalytic reaction or non-catalytic reaction, or a combination of both, it has been customary to use pressures of about 3 to about 7 atmospheres and to separate unreacted sulfur from the formed carbon bisulfide and hydrogen sulfide by first condensing the sulfur vapors to molten sulfur, then scrubbing the uncondensed gases containing carbon bisulfide and hydrogen sulfide with molten sulfur flowing countercurrent through a packed or plate column, then scrubbing the gases in another packed or plate column with recycled carbon bisulfide condensate, to remove the last traces of sulfur therefrom, then condensing out the major part of the carbon bisulfide from the gas stream and removing the remaining carbon bisulfide by scrubbing the uncondensed gas stream in another packed or plate column with a lean absorber oil, to absorb the carbon bisulfide therein and from which the absorbed carbon bisulfide is subsequently stripped by distillation, after which the hydrogen sulfide gas was passed to a Claus type sulfur recovery system and the absorber oil heated to strip and recover the absorbed carbon bisulfide therefrom. This process is illustrated and described briefly in Canadian Patent No. 562,384 and is described in greater detail in U.S. Patent No. 2,661,267.

As shown by the description above, this process is unduly complicated, requiring many pieces of expensive equipment and the operation and maintenance thereof.

One of the objects of this invention is to provide a simplified process for the production of carbon bisulfide and hydrogen sulfide by the reaction of sulfur and hydrocarbons in which pressures are maintained on the reacting gases such that the reaction of the sulfur vapor and hydrocarbon gas takes place entirely within the reaction furnace, without the provision of outside reactor space, and in which the separation of the unreacted sulfur and carbon bisulfide from the hydrogen sulfide is greatly simplified and the use of a molten sulfur scrubber and a carbon bisulfide sulfur scrubber to remove sulfur vapor from the gas stream is eliminated.

Another object of this invention is to provide a process for the production of carbon bisulfide and hydrogen sulfide by the reaction of sulfur and hydrocarbons at elevated pressure and temperature in which the carbon bisulfide and unreacted sulfur are separated in liquid phase from the hydrogen sulfide gas at a temperature above the melting point of sulfur and the carbon bisulfide and sulfur subsequently separated and recovered.

Another object of this invention is to provide a process of producing carbon bisulfide and hydrogen sulfide by the reaction of sulfur and hydrocarbons at high pressure in which the use of a scrubber and lean oil to absorb carbon bisulfide out of the gas stream is eliminated and the separation and recovery of the carbon bisulfide effected more economically than in prior processes operating at lower pressure.

Another object of this invention is to provide a more efficient and more economical method of separating the unreacted sulfur and carbon bisulfide from the hydrogen sulfide and other uncondensed gases and for then separating the carbon bisulfide from the unreacted sulfur in such a manner that the recovery of the carbon bisulfide is greatly simplified.

Various other objects and advantages of the invention will appear as this description proceeds.

I have found that if the operating pressure in the heating furnace is maintained above 10 atmospheres, and preferably around 20 atmospheres, a conversion of 95% of the carbon in methane to carbon bisulfide can readily be obtained in the heating furnace and that if the carbon bisulfide and unreacted sulfur are separated from the hydrogen sulfide at substantially the operating pressure of the furnace and at temperatures above the melting point of sulfur and the carbon bisulfide later separated from the unreacted sulfur at elevated pressure, a greatly simplified and more economical overall process is provided.

Referring now to the drawings which diagrammatically illustrate three methods by which the principles of my invention may be practiced, FIG. 1 illustrates a process in which the unreacted sulfur and formed carbon bisulfide are condensed and separated from the hydrogen sulfide in a stabilizing column operating at a temperature above the melting point of sulfur, except at the very top thereof, and the carbon bisulfide then separated and recovered from the sulfur.

FIG. 3 illustrates a further modification of the process in which a filter is used to trap solids from the gas stream and in which pumps are eliminated.

Figure 1:
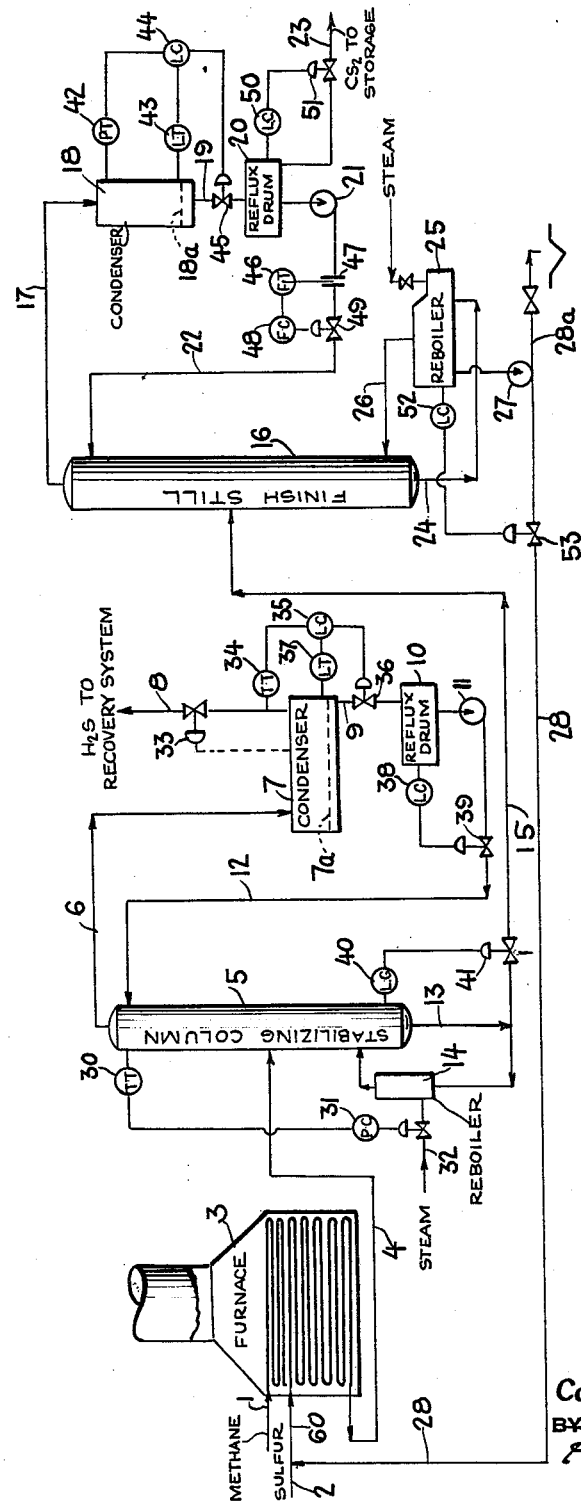

In FIG. 1 the hydrocarbon gas, consisting principally of methane, from line 1 and molten sulfur from line 2, mixed with recycle sulfur from the line 28, to provide the sulfur feed 60, are fed into the furnace 3 and heated in the tubes of furnace 3 to reaction temperature, preferably between 450° and 700° C., and maintained under a pressure of about 20 atm. to effect a conversion of approximately 95% of the methane to carbon bisulfide and hydrogen sulfide within a retention period of about 35 to 55 seconds. When operating under these conditions the exit gas temperature from the furnace will be about 640° C. The sulfur methane ratio should be about stoichiometric, namely, 128 lbs. sulfur to 16 lbs. methane, although ratios both above and below this may be used. Normally a stoichiometric excess of sulfur of from 1 to 10% is used. These operating conditions can be widely varied, however, as described hereinafter. The tubes of the furnace 3 need not all be of the same diameter nor is it necessary that furnace 3 be a tubular furnace.

From the furnace 3 the reaction gas stream flows through the line 4 to approximately the mid point of a stabilizer column 5 which may be a bubble plate or packed column, preferably the former. The column 5 operates at about 19 atm., being the furnace entrance pressure less a pressure drop of about 1 atm., and at a top temperature of about 100° C., a bottom temperature of about 180° C. and a temperature at the point of entrance of about 150° C. In normal operation of a plate column all of the column 5, except the top two trays, are above the melting point of sulfur at 20 atm. and the top is operated at about 100° C. at 20 atm. A sufficient number of plates, or sufficient space, above the feed plate is used so that all the unreacted sulfur in the furnace exit gases will be separated from the gas stream, above its melting point of 120° C., and no insoluble sulfur, which might cause plugging, is separated in the column 5.

From the top of column 5 the overhead gas stream containing $H_2S$, unreacted $CH_4$ and small quantities of $CS_2$ flows through the line 6 to a condenser 7, operated at a temperature of about 38° C. or lower. The minimum temperature of condenser 7 should be above 27° C. at 20 atm. as otherwise all the $H_2S$ will be condensed in the condenser. This condenser is preferably adapted to maintain a liquid condensate level 7a therein. From condenser 7 the uncondensed gas stream flows through the line 8 to an $H_2S$ recovery system while the condensate flows through the line 9 to a reflux drum 10 from which it is pumped by pump 11 through the line 12 back to the top of column 5 to constitute the reflux stream.

The condensed sulfur and carbon bisulfide from the bottom of column 5 flows through the line 13 where a portion is diverted to the reboiler 14 where it is revaporized and sent back into the bottom of column 5 and the remainder flows through the line 15 and enters the finish still 16 at approximately the mid point.

The finish still 16, in the embodiment here described, is preferably operated at a pressure of about 7 atm. and at a top temperature of about 120° C., the reboiler 25 is operated at a temperature of about 180° C. and the temperature at the point of entrance to the still 16 is about 122° C. to vaporize and separate the carbon bisulfide from the sulfur.

From the top of still 16 the gas stream containing the carbon bisulfide flows through the line 17 to a condenser 18, operated at a temperature of about 45° C. or lower, and preferably adapted to maintain a liquid condensate lever 18a therein. The condensed $CS_2$ flows from the condenser 18 through the line 19 to a reflux drum 20 from which a portion is pumped by pump 21 through the line 22 back to the top of still 16 to provide a reflux stream in the top of still 16, while the remainder is flowed through the line 23 to a caustic wash system and then to storage.

By separating the hydrogen sulfide, carbon bisulfide and sulfur in this way no oil absorption system is necessary and carbon bisulfide of commercial purity can be sent direct to storage after a caustic wash. The recovery of the carbon bisulfide is greatly simplified and the loss of carbon bisulfide to the hydrogen sulfide recovery system through the line 8 is not significantly different from that which occurs when the carbon bisulfide and hydrogen sulfide are first separated from the condensed sulfur and then separated from each other according to prior recovery processes.

The condensed sulfur containing some carbon disulfide flows from the bottom of still 16 through the line 24 to a reboiler 25 in which a portion of the carbon bisulfide is revaporized and sent back into the bottom of still 16 through the line 26, the sulfur being substantially non-volatile at the temperature and pressure of the reboiler, and the sulfur and any carbon bisulfide remaining therein is pumped by pump 27 through the line 28 into the sulfur feed line 2 to provide the sulfur feed stream 60 leading into furnace 3. A purge line 28a is provided to permit purging sulfur from the system if necessary.

By separating the sulfur and carbon bisulfide from the hydrogen sulfide as described and then separating the sulfur from the carbon bisulfide, no entrainment separator or carbon bisulfide scrubber for sulfur entrainment is necessary and the recovery process is considerably simplified over prior sulfur separation processes.

Various well known controls have been indicated diagrammatically on the drawings as follows:

At the top of column 5, a temperature transmitter 30 transmits the temperature recording of the top of the column to pressure controller 31 for controlling the flow of high pressure steam through the line 32 to the reboiler 14. In the line 8 leading from the condenser 7 a back pressure control valve 33 operated from the condenser 7 maintains the desired back pressure at this point. Temperature transmitter 34 in the line 8 transmits the temperature record at this point to reset the level controller 35 which operates the control valve 36 for controlling the level of condensate 7a in the condenser 7. A level transmitter 37 transmits the condensate level recording from the condenser 7 to the level controller 35. Level controller 38 connected to reflux drum 10 controls the valve 39 to regulate the flow of reflux to the top of column 5 and level controller 40 controls valve 41 to control the flow of sulfur and carbon bisulfide from the bottom of column 5 through the line 15 to the still 16.

From the condenser 18 a pressure transmitter 42 and a level transmitter 43 controlled by the level of condensate 18a in the condenser 18 transmit their recording to level controller 44 which controls the operation of valve 45 in the line 19. A flow transmitter 46 receiving flow signals from an orifice plate 47 in the line 22 controls the flow controller 48 for the valve 49 to control reflux flow through the line 22. A level controller 50 operating from the reflux drum 20 controls the valve 51 to regulate the flow of carbon bisulfide through the line 23 to the carbon bisulfide recovery system and level controller 52 operated from the reboiler 25 controls the valve 53 to regulate the flow of recycle sulfur through the line 28 back to the feed line 60 to the furnace 3. All these are standard instrumentations well known in the industry.

Figure 2:
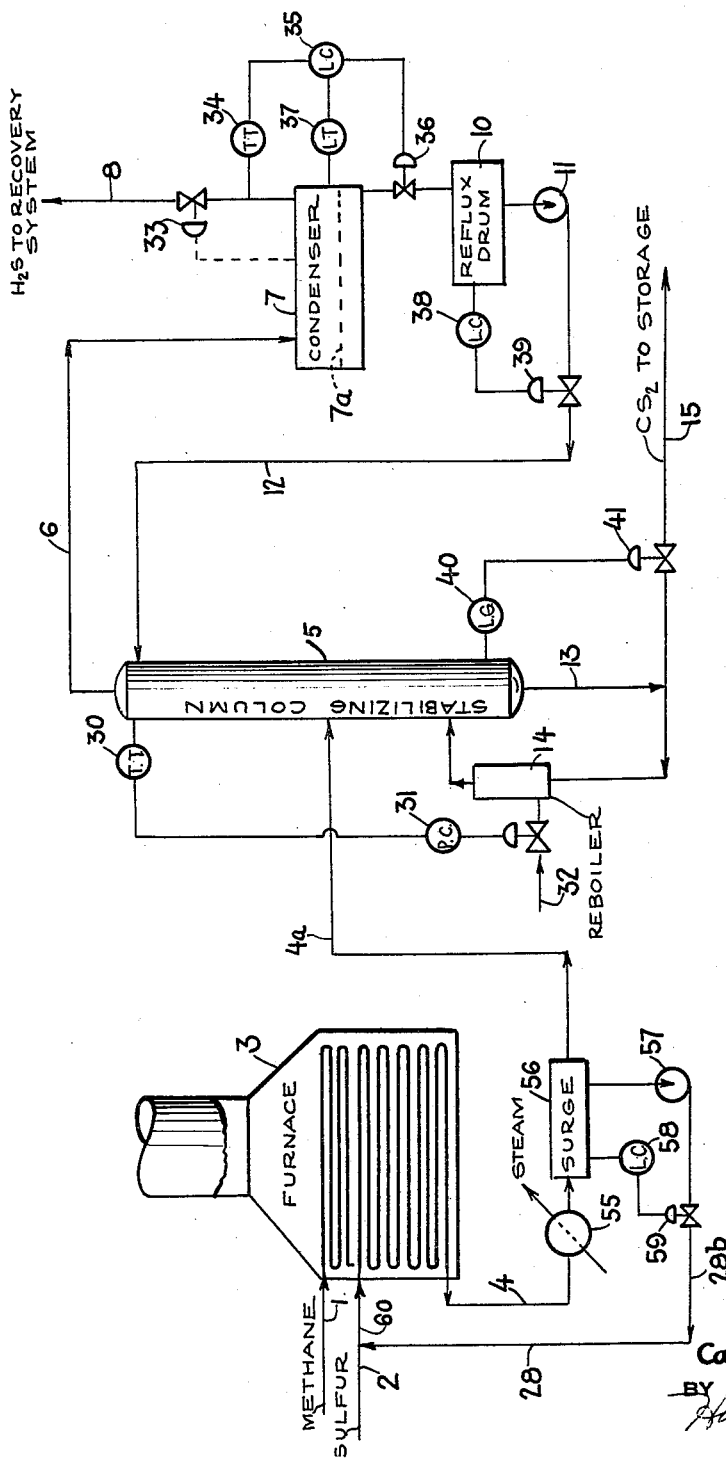
FIG. 2 illustrates a similar process in which the major part of the unreacted sulfur is condensed out of the furnace exit gas stream before entering the stabilizing column.

The embodiment of the process illustrated in FIG. 2 is substantially similar to that illustrated and described in connection with FIG. 1, except for the omission of the finish still 16 and parts connected therewith, and like parts have been given the same numbers in both drawings. The process illustrated in FIG. 2 differs from that described in FIG. 1 in that a sulfur condenser is inserted in the line 4 from the furnace to the stabilizing column 5. This reduces the sulfur flow to the column 5 and likewise reduces the heat load on the column 5 and its condenser 7 and permits a reduction in the size and a simplification of the design of both these parts. It also permits the finish still 16 to be omitted and while the $CS_2$ produced will contain about 0.5% of sulfur, such $CS_2$ can be used without further sulfur removal for the production of carbon tetrachloride or in other processes where the presence of a small amount of sulfur is not objectionable.

As illustrated in FIG. 2 the reaction gas stream from the furnace 3 flows through the line 4 to a condenser 55 where it is cooled to produce molten sulfur by indirect heat exchange with water flowing through the condenser. The condenser 55 operates at a temperature of about 150–160° C. The steam produced is recovered and used in the process and the condensed sulfur is separated from the gas stream in a surge tank 56 and recycled by the pump 57 through the lines 28b and 28 back to the sulfur feed line 60. A level controller 58 controlling valve 59 regulates the flow of recycle sulfur from the surge tank 56 back to the sulfur feed line.

From the surge tank 56 the reaction gas stream still containing some sulfur flows through the line 4a and onto the feed plate of the stabilizing column 5 from which point the process of separating and recovering the $H_2S$, $CS_2$ and remaining sulfur is the same as that described in connection with column 5 of FIG. 1, but by virtue of the fact that most of the heat content of the furnace gases has been removed from the reaction gas stream in the condenser 55 the size of the stabilizing column 5 and condenser 7 may be substantially reduced and their design simplified and the amount of sulfur flowing through the line 15 is reduced to about 0.5% of the $CS_2$ flowing through this line so that still 16 and its operating parts may be omitted. The still 16 may, however, also be used in connection with the process of FIG. 2 if desired.

The temperature and pressure at which column 5 operates remains substantially the same as described in connection with FIG. 1. The carbon bisulfide flowing through the line 15 may be passed direct to storage, it may be used directly for the production of carbon tetrachloride where any sulfur contained therein is automatically separated and recovered or it may be processed in a still similar to still 16 of FIG. 1 or in various other ways to remove the residual sulfur therefrom.

FIG. 3 illustrates a further modification in which the reaction gas stream from the furnace 3 flows through the line 4 to a filter 4b containing a porous bed 4c of Berl saddles or the like in which any solids in the gas stream are filtered out, and then to a sulfur condenser 55a in which sulfur is condensed out of the gas stream, by indirect heat exchange with water passing through the condenser. The condenser 55a operates at a temperature of about 150–160° C. and the steam produced is recovered and used in the process. A back pressure control 61 operating from the steam line from condenser 55a maintains the desired water pressure in condenser 55a. The sulfur condenser is located sufficiently above the furnace 3 that the condensed sulfur flows by gravity through the line 28c into the sulfur feed line 2.

From the sulfur condenser 55a the uncondensed gases ($H_2S$ and $CS_2$) flow through the line 4d into a pool of of liquid in vessel 62, where these gases are preferably discharged below the level of the liquid pool 62a to further separate dirt and solids from the $H_2S$ and $CS_2$ gas stream. A check valve 4e in the line 4d prevents any backflow through the line 4d. From the vessel 62 a gas and liquid stream at a temperature of about 150° C. flows through the line 63 to the feed plate of stabilizer column 5a. The liquid in vessel 62 is maintained level with line 63 primarily by the outflow from line 63 so that any sulfur passing through line 4d will flow with the main flow stream into column 5a and not be trapped in vessel 62.

Carbon disulfide condensed in the upper part of stabilizer column 5a with some hydrogen sulfide dissolved therein is caught in a weir 63a in column 5 and flows back through the line 63b into the vessel 62, where it is revaporized by the hot gases passing through vessel 62. A flow controller 64 operating from the vessel 62 or from line 63b controls a valve 64a in the line 63b to control the flow of liquid from line 63b into vessel 62. Any excess carbon bisulfide flowing into weir 63a will overflow the weir and flow down column 5a where it will be revaporized in the lower portion of the column.

Column 5a operates at about 19 atm. pressure when the pressure in furnace 3 is maintained at 20 atm. The temperature in column 5a is maintained at about 100° C. at the top and about 180° C. at the bottom. A sufficient number of plates, or sufficient space, above the feed plate is used so that any unreacted sulfur which has not been condensed in condenser 55a will be separated from the gas stream, above its melting point, and no insoluble sulfur is separated in column 5a. The amount of sulfur in the gas entering column 5a is very small.

From the top of column 5a the overhead gas stream, containing $H_2S$, unreacted $CH_4$ and small quantities of $CS_2$ flows through the line 6a to a condenser 7b operated at a temperature of about 38° C. or lower. This condenser is adapted to maintain a liquid condensate level 7c therein. From the condenser 7b the uncondensed gas stream flows through line 8a to an $H_2S$ recovery system, such as a Claus sulfur recovery system, and the condensate flows through the line 9a to the reflux drum 10a and from the reflux drum it flows by gravity through the line 12a to the top of column 5a to constitute the reflux stream.

The condensed sulfur and carbon bisulfide from the bottom of column 5a flows through the line 13a where a portion is diverted to the reboiler 14a where it is revaporized and sent back into the bottom of column 5a and the remainder flows through the line 15a and enters the finish still 16a at approximately the mid point.

The finish still 16a, in the embodiment of FIG. 3, is preferably operated at a pressure of about 7 atm. and at a top temperature of about 120° C., the reboiler 25a is operated at a temperature of about 180° C. and the temperature at the point of entrance to the still 16a is about 122° C. to vaporize and separate the carbon bisulfide from any sulfur remaining in the carbon bisulfide at this point.

From the top of still 16a the gas stream containing the carbon bisulfide flows through the line 17a to a condenser 18b, operated at a temperature of about 45° C. or lower, and preferably adapted to maintain a liquid condensate level 18c therein. The condensed $CS_2$ flows from the condenser 18b through the line 19a to a reflux drum 20a from which a portion flows by gravity through the line 22a back to the top of still 16a to provide a reflux stream in the top of still 16a, while the remainder is flowed through the line 23a to a caustic wash system and then to storage.

As in the embodiment of FIG. 1 by separating the hydrogen sulfide, carbon bisulfide and sulfur in this way no oil absorption system is necessary and carbon bisulfide of commercial purity can be sent direct to storage after a caustic wash. The recovery of the carbon bisulfide is greatly simplified and the loss of carbon bisulfide to the hydrogen sulfide recovery system through the line 8a is not significantly different from that which occurs when the carbon bisulfide and hydrogen sulfide are first separated from the condensed sulfur and then separated from each other according to prior recovery processes.

The small amount of condensed sulfur containing some carbon disulfide flows from the bottom of still 16a through the line 24a to a reboiler 25a in which a portion of the carbon bisulfide is revaporized and sent back into the bottom of still 16a through the line 26a, the sulfur being substantially non-volatile at the temperature and pressure of the reboiler, and the sulfur and any carbon bisulfide remaining therein which is collected in reboiler 25a flows through the line 28d to a Claus sulfur recovery unit where it is recovered along with the sulfur recovered from the hydrogen sulfide flowing through line 8a.

The controls diagrammatically shown in FIG. 3 are similar to those illustrated in FIG. 1.

At the top of column 5a, a temperature transmitter 30a transmits the temperature recording of the top of the column to pressure controller 31a for controlling the flow of high pressure steam through the line 32a to the reboiler 14a. In the line 8a leading from the condenser 7b a back pressure control valve 33a operated from the condenser 7b maintains the desired back pressure at this point. Temperature transmitter 34a in the line 8a transmits the temperature record at this point to reset the level controller 35a which operates the control valve 36a for controlling the level of condensate 7c in the condenser 7b. A level transmitter 37a transmits the condensate level recording from the condenser 7b to the level controller 35a. Level controller 38a connected to reflux drum 10a controls the valve 39a to regulate the flow of reflux to the top of column 5a and level controller 40a controls valve 41a to control the flow of sulfur and carbon bisulfide from the bottom of column 5a through the line 15a to the still 16a.

From the condenser 18b a pressure transmitter 42a and a level transmitter 43a, controlled by the level of condensate 18c in the condenser 18b, transmit their recording to level controller 44a which controls the operation of valve 45a in the line 19a. A flow transmitter 46a receiving flow signals from an orifice plate 47a in the line 22a controls the flow controller 48a for the valve 49a to control reflux flow through the line 22a. A level controller 50a operating from the reflux drum 20a controls the valve 51a to regulate the flow of carbon bisulfide through the line 23a to the carbon bisulfide recovery system and level controller 52a operated from the reboiler 25a controls the valve 53a to regulate the flow of sulfur through the line 28d to the Claus sulfur recovery unit (not shown). As in the embodiment of FIG. 1 all these are standard instrumentations well known in the industry.

In the embodiment of FIG. 3 all pumps in the main process lines following the furnace 3 have been eliminated and the filter 4b and dirt trap provided by vessel 62 assure that dirt will not accumulate in the process lines or in columns 5a and 16a. Cleaning outlets (not shown) are provided in the casing of filter 4b and vessel 62.

While it is preferable to operate the process of the embodiment of FIGS. 1, 2 and 3 at a pressure of 20 atm. at the entrance to the furnace 3, pressures as low as 10 atm. may be used with some requirement for additional cooling in condensers 7 or 7b and additional boil up in reboilers 14 or 14a. Temperatures of 450 to 700° C. are preferable, but temperatures of 750° C. or higher may be tolerated with some penalty of shorter tube life. With increased pressure, space velocities may be increased. For example, a 70% conversion of the methane to carbon bisulfide and hydrogen sulfide can be secured at 20 atm with a temperature of 750° C. and a space velocity of 1860 reciprocal hours. For methane conversions of 70 to 95% the space velocity may vary between 2000 and 200 reciprocal hours, depending upon the pressure, temperature and throughput desired. With decreased space velocity and increased retention time conversion above 95% can be secured. Retention time may vary between about 6 seconds and 1.2 minutes.

While a gas high in methane is preferred, saturated hydrocarbon gas, such as natural gas containing ethane, propane, butane, pentane, etc., may be used if the percentage of higher hydrocarbons is below that which causes excessive fouling of the equipment. By virtue of the fact that no catalyst beds are required a higher percentage of the higher homologs may be tolerated than in a catalytic reaction.

EXAMPLE 1

The furnace size as well as the size of the stabilizing column, finish still, condensers, etc., will vary with the design capacity. The following size will produce about 90 tons per stream day of carbon bisulfide.

Into a furnace 3, such as illustrated in FIG. 1, having a gas preheat section consisting of about 200 linear feet of tubing and providing a methane preheat area of about 187 sq. ft. and a volume of about 10.5 cu. ft. and a sulfur heating and reaction section consisting of about 750 linear feet of tubing providing an area of about 1300 sq. ft and a volume of about 107 cu. ft., methane and sulfur are fed at the rate of 1739 lbs. methane and 13,902 lbs. sulfur per hour. The tubes are heated so as to maintain an exit gas temperature of about 640° C. and in the sulfur heating and reaction section are preferably made of stainless steel. At 20 atm. furnace entrance pressure the space velocity through the sulfur heating and reaction section is 1089 cu. ft. of gas per cu. ft. of furnace volume per hour or 1089 reciprocal hours measured at standard conditions. The retention time for actual operating conditions is 37.3 seconds and the methane conversion is about 95%.

The space velocity may be increased and the retention time decreased by from 10 to 20% if the tube wall temperature is increased, or if a lower conversion is accepted. For example, to decrease the retention time by 10% will lower the conversion to about 90% and to decrease the retention time by 20% will lower the conversion to about 80.5%. Decreased space velocity and increased retention time will increase the conversion to above 95%.

From the furnace 3 operated as above decribed, the reaction gases flowing through the line 4 to the stabilizer 5 or 5a consists of approximately 87 lbs./hr. of unreacted $CH_4$, 695 lbs./hr. unreacted sulfur, 7019 lbs./hr. $H_2S$ and 7840 lbs./hr. of $CS_2$.

The operating conditions for the stabilizing column 5 or 5a and the finish still 16 or 16a are determined by the boiling point of the materials to be separated at the operating pressure.

The boiling point of a saturated solution of $H_2S$ and $CS_2$ is a function of the mol fraction of each as well as the total pressure. For example, pure $CS_2$ has the following boiling points:

|  | ° C. |
|---|---|
| 6 atm | 113 |
| 10 atm | 137 |
| 20 atm | 175 |

However, if 1 mol of $H_2S$ is in the liquid phase with 9 mols of $CS_2$ the boiling points are reduced to:

|  | ° C. |
|---|---|
| 6 atm | 72 |
| 10 atm | 99 |
| 29 atm | 142 |

In the stabilizer 5 or 5a therefore the temperature varies from top to bottom as the ratio of $H_2S$ to $CS_2$ in the liquid varies from top to bottom at the operating pressure. The temperature of 150° C. at the entrance plate is an equilibrium temperature when all the sensible heat of the gases above this temperature has been dissipated by the evaporation of liquid $H_2S$ and $CS_2$ which will take place in and on the entrance tray. If the gases are cooled prior to the stabilizer 5 or 5a, as in FIGS. 2 and 3, then additional heat must be provided in the reboiler 14 or 14a so that enough $CS_2$ vapor will be present to keep the temperature at the entrance point above the melting point of sulfur. For example, at a total pressure of 20 atm. I must provide one mol of $CS_2$ vapor in the center of the column for each 2.55 mols of $H_2S$ vapor, to keep the column at the entrance point above 120° C. In FIG. 1, where the furnace gases are not cooled prior to the stabilizer, the sensible heat of these gases will boil up enough $CS_2$ (which has been refluxed back to the column) to provide a temperature of 150° C. at the entrance point and a temperature above 120° C. on all except the two top trays of the column. At 10 atm., I must provide 1.93 mols of $CS_2$ for each one mol of $H_2S$ to maintain a temperature of 120° C. Since the sensible heat of the furnace gases evaporates $CS_2$, the process of FIG. 1 in which these furnace gases are not cooled, permits the use of a smaller reboiler than FIGS. 2 and 3 in which the body of the sulfur has been removed from the gases by cooling the gases to 150–160° C. in the condenser 55 or 55a.

The use of higher pressure also facilitates the separation of the $CS_2$ from the $H_2S$ and the unreacted $CH_4$ going to the hydrogen sulfide recovery system. For example, if the $H_2S$ is recovered and converted to sulfur in a Claus type sulfur recovery unit, I provide the following gas compositions to flow through the line 8 or 8a to the Claus unit from the condenser 7 or 7b maintained at a temperature of 38° C. or as much below this temperature as can be gotten with unrefrigerated cooling water.

|  | 20 atm. | 10 atm. |
|---|---|---|
| $H_2S$ lb. mols/hour | 206 | 206 |
| $CH_4$ mols/hour | 5.4 | 5.4 |
| $CS_2$ mols/hour | 1.9 | 10.1 |
| Percent $CS_2$ lost | 1.85 | 9.8 |

With 95% conversion for the above example, I recycle about 695 lbs. of sulfur per hour through line 28 back to the furnace from the finish still 16 in the embodiment of FIG. 1 and mostly from the sulfur condensed in condenser 55 or 55a in the embodiments of FIGS. 2 and 3. In FIG. 1 this sulfur will carry about 347 lbs. of $CS_2$ per hour.

In FIG. 2 only negligible quantities of $CS_2$ will be recycled if still 16 is used and none if still 16 is omitted. $CS_2$ recycled to the furnace will have some value in reducing the viscosity of the sulfur in the furnace, but the process is not dependent on it. The $CS_2$ recycled to the furnace is automatically recovered in the subsequent reprocessing. At 7 atm. total pressure the finish still 16 or 16a will operate at 120° to 122° C. everywhere but in the reboiler 25 or 25a where the temperature will reach 180° C. The pressure is reduced to 7 atm. in the still 16 or 16a so that a high concentration of sulfur (67 wt. percent) may be reached in the reboiler, with the reboiler operating on 400 lbs. steam.

When operating at 20 atm. pressure in the heating furnace 3 and 7 atm. in the finish still 16 or 16a a temperature of 38° C. in the condenser 7 or 7b, a temperature of about 45° C. in the condenser 18 or 18b and with the feed ratio given at the beginning of this example, for a 95% conversion of the methane, the composition of the streams flowing through the lines 1, 2, 4, 8, 15, 23, 28 and 60 of FIG. 1 is approximately as follows:

*Table I*

| Line | 1 | 2 | 4 | 8 | 15 | 23 | 28 | 60 |
|---|---|---|---|---|---|---|---|---|
| $CH_4$, lb./hr | 1,739 | | 87 | 87 | | | | |
| $S_2$, lb./hr | | 13,206 | 695 | | | 695 | | 13,901 |
| $H_2S$, lb./hr | | | 7,018 | 7,018 | | | 695 | |
| $CS_2$, lb./hr | | | 8,187 | 149 | 8,038 | 7,691 | 347 | 347 |

When operating at 10 atm. pressure in the heating furnace 3 and 6 to 7 atm. in the finish still 16 or 16a a temperature of 15° C. in condenser 7 or 7b and a temperature of about 45° C. in condenser 18 or 18b, and with the feed ratio given at the beginning of this example, for a 90% conversion of the methane the composition of the various streams flowing through the lines 1, 2, 4, 8, 15, 23, 28 and 60 of FIG. 1 is approximately as follows:

*Table II*

| Line | 1 | 2 | 4 | 8 | 15 | 23 | 28 | 60 |
|---|---|---|---|---|---|---|---|---|
| $CH_4$, lb./hr | 1,739 | | 174 | 174 | | | | |
| $S_2$, lb./hr | | 12,511 | 1,390 | | | 1,390 | | 13,901 |
| $H_2S$, lb./hr | | | 6,649 | 6,649 | | | 1,390 | |
| $CS_2$, lb./hr | | | 8,122 | 191 | 7,931 | 7,236 | 695 | 695 |

At 20 atm. pressure the condenser 7 or 7b may be cooled sufficiently below 38° C. to prevent material loss of $CS_2$ through the line 8 or 8a with cooling water normally available at 28 to 35° C., but at 10 atm. pressure the condenser 7 or 7b will require cooling to around 15° C. to prevent substantial loss of $CS_2$ in the $H_2S$ stream flowing through line 8 or 8a. It should be maintained above −3° C. to prevent condensation of all the $H_2S$ therein. Temperatures of 15° C. in the condenser 7 or 7b will normally require the use of artificial refrigeration to provide the necessary cooling. Pressures of above 20 atm. may be used but are not preferred.

When operating according to FIG. 2 at 20 atm. pressure, a temperature of 150–160° C. in the condenser 55 and a temperature of about 38° C. in condenser 7, for a 95% conversion of the methane the composition of the streams flowing through the lines 1, 2, 4, 4a, 8, 15, 28b and 60 of FIG. 2 is approximately as follows:

*Table III*

| Line | 1 | 2 | 4 | 4a | 8 | 15 | 28b | 60 |
|---|---|---|---|---|---|---|---|---|
| $CH_4$, lb./hr | 1,739 | | 87 | 87 | 87 | | | |
| $S_2$, lb./hr | | 13,246 | 695 | 40 | | 40 | 655 | 13,901 |
| $H_2S$, lb./hr | | | 7,018 | 7,018 | 7,018 | | | |
| $CS_2$, lb./hr | | | 8,100 | 7,840 | 149 | 7,691 | 260 | 260 |

When operating according to FIG. 3 at 20 atm. pressure a temperature of 150–160° C. in condenser 55a and a temperature of about 38° C. in condenser 7b for an approximate 95% conversion of methane, the composition of the streams flowing through lines 1, 2, 4, 4d, 8a, 15a, 23a, 28c, 28d, 63 and 63b is approximately as follows:

*Table IV*

| Line | 1 | 2 | 4 | 4d | 8a | 15a | 23a | 28c | 28d | 63 | 63b |
|---|---|---|---|---|---|---|---|---|---|---|---|
| $CH_4$, lb./hr | 1,739 | | 87 | 87 | 87 | | | | | 87 | |
| $S_2$, lb./hr | | 13,246 | 695 | 40 | | 40 | | 655 | 40 | | |
| $H_2S$, lb./hr | | | 7,018 | 7,018 | 7,018 | | | | | 7,188 | 170 |
| $CS_2$, lb./hr | | | 8,100 | 7,840 | 149 | 7,691 | 7,671 | 260 | 20 | 9,340 | 1,500 |

While I have described preferred embodiments of the process and given an illustrative example of its application at different pressures, it will be understood that these are for purposes of illustration and that various changes and modifications may be made from the illustrations given without departing from the spirit of my invention or the scope of the following claims.

This application is a continuation-in-part of my copending application Serial No. 805,443, filed April 10, 1959, now abandoned.

I claim:
1. The method of producing carbon bisulfide and hydrogen sulfide by the reaction of sulfur and saturated hydrocarbons, which comprises passing sulfur vapor and hydrocarbon gas through a heating furnace heated to a temperature of 450° to 750° C., maintaining a pressure of 10 atm. to 20 atm. on the gases in said furnace and maintaining said gases in contact for a period of time sufficient to convert the major portion of the methane in said hydrocarbon gas into hydrogen sulfide and carbon bisulfide, passing the furnace exit gases through a filter to remove solids from the gas stream, separating the unreacted sulfur in the liquid phase from the hydrogen sulfide and carbon bisulfide in the vapor phase by condensation of sulfur from the gas stream at a pressure between 9 and 19 atm. and a temperature in excess of 120° C. and separating the carbon bisulfide in the liquid phase from the hydrogen sulfide in the vapor phase by distillation and condensation at a pressure between about 9 and 19 atm. and a temperature in excess of 120° C.

2. The method of producing carbon bisulfide and hydrogen sulfide by the reaction of sulfur and saturated hydrocarbon gas at temperatures between 450° to 750° C. which comprises passing sulfur vapor and hydrocarbon gas at a pressure in excess of 10 atm. through a heating furnace to produce carbon disulfide and hydrogen sulfide, cooling the reaction vapors to a temperature above about 120° C. and a pressure in excess of about 9 atm. to form a vapor phase of hydrogen sulfide and unreacted hydrocarbons and a liquid phase of carbon bisulfide and unreacted sulfur, recovering the hydrogen sulfide from the vapor phase, removing carbon bisulfide as a vapor from the said liquid phase by distillation at a temperature above about 120° C. and a pressure in excess of about 6 atm. and recovering the carbon bisulfide.

3. The method of producing carbon bisulfide and hydrogen sulfide by the reaction of sulfur and saturated hydrocarbon gas at temperatures between 450 and 750° C. which comprises passing sulfur vapor and hydrocarbon gas at a pressure in excess of 10 atm. and a space velocity of approximately 200 to 2000 reciprocal hours through the tubes of a heating furnace to produce carbon bisulfide and hydrogen sulfide, cooling the reaction vapors to a temperature above about 120° C. and a pressure in excess of about 9 atm. to form a vapor phase of hydrogen sulfide and unreacted hydrocarbons and a liquid phase of carbon bisulfide and unreacted sulfur, recovering the hydrogen sulfide from the vapor phase, removing the carbon bisulfide as a vapor from the liquid phase by distillation at a temperature above about 120° C. and a pressure in excess of 6 atm. and recovering the carbon bisulfide.

4. The method of producing carbon bisulfide and hydrogen sulfide by the reaction of sulfur and saturated hydrocarbons which comprises passing sulfur vapor and hydrocarbon gas through the tubes of a heating furnace heated to a temperature of 450 to 750° C. at a space velocity of between 200 and 2000 reciprocal hours while maintaining a pressure of 10 to 20 atm. on the gases in the said furnace to convert in excess of 70% of said gases into carbon bisulfide and hydrogen sulfide, cooling the reaction vapors to a temperature above about 120° C. and a pressure between about 9 and 19 atm. to form a vapor phase of hydrogen sulfide and unreacted hydrocarbons and a liquid phase of carbon bisulfide and unreacted sulfur, recovering hydrogen sulfide, distilling carbon bisulfide from the liquid phase at a temperature above about 120° C. and a pressure between about 9 and 19 atm. recovering the carbon bisulfide and recycling the unreacted sulfur in liquid form to the heating furnace.

5. The method of producing carbon bisulfide and hydrogen sulfide by the reaction of sulfur and hydrocarbon gas at temperatures between 450 to 750° C. which comprises contacting sulfur vapor and hydrocarbon gas at a pressure in excess of 10 atm. to produce carbon bisulfide and hydrogen sulfide and condensing carbon bisulfide and unreacted sulfur from the hydrogen sulfide in vapor phase at a pressure in excess of 10 atm. and a temperature above the melting point of sulfur.

6. The method of producing carbon bisulfide and hydrogen sulfide by the reaction of sulfur and saturated hydrocarbons which comprises passing sulfur vapor and hydrocarbon gas through the tubes of a heating furnace heated to a temperature of 450 to 750° C. at a space velocity of between 200 and 2000 reciprocal hours while maintaining a pressure of 10 to 20 atm. on the gases in said furnace to convert in excess of 80% of said gases into carbon bisulfide and hydrogen sulfide, and cooling the reaction gases to a temperature in excess of about 120° C. and a pressure between about 9 to 19 atm. to condense carbon bisulfide and unreacted sulfur in liquid phase from the hydrogen sulfide in the vapor phase.

7. The method of producing carbon bisulfide and hydrogen sulfide by the reaction of sulfur and saturated hydrocarbons which comprises passing sulfur vapor and hydrocarbon gas through the tubes of a heating furnace heated to a temperature of 450 to 750° C. at a space velocity of between 200 and 2000 reciprocal hours while maintaining a pressure of 10 to 20 atm. on the gases in said furnace to convert in excess of 70% of the said gases into carbon bisulfide and hydrogen sulfide, condensing unreacted sulfur from the hydrogen sulfide and carbon bisulfide in the vapor phase at a pressure between about 9 and 19 atm. and a temperature above about 120° C. and then condensing carbon bisulfide from hydrogen sulfide in the vapor phase at a pressure between about 9 and 19 atm. and a temperature above about 120° C.

References Cited in the file of this patent

UNITED STATES PATENTS

| | | |
|---|---|---|
| 2,492,719 | Thacker | Dec. 27, 1949 |
| 2,882,130 | Porter | Apr. 14, 1959 |